United States Patent [19]

Shepherd et al.

[11] 4,407,112
[45] Oct. 4, 1983

[54] GRASS MOWER

[75] Inventors: Ian C. Shepherd, Mulgrave; Ian G. Pearson, Hampton; Donald C. Gibson, Beaumaris, all of Australia

[73] Assignee: Commonwealth Scientific and Industrial Research Organization, Australia

[21] Appl. No.: 922,452

[22] Filed: Jul. 6, 1978

[30] Foreign Application Priority Data

Jul. 12, 1978 [AU] Australia .............................. PD0813

[51] Int. Cl.³ ...................... A01D 53/00; A01D 87/10
[52] U.S. Cl. .................................... 56/13.4; 56/320.2
[58] Field of Search .................. 56/13.4, 320.1, 320.2; 416/178

[56] References Cited

U.S. PATENT DOCUMENTS

| | | | |
|---|---|---|---|
| Re. 29,139 | 2/1977 | Messner | 56/13.4 |
| 2,737,003 | 3/1956 | Beers | 56/13.4 |
| 2,760,327 | 8/1956 | Bovee | 56/13.4 |
| 2,953,887 | 9/1960 | Boesch, Jr. et al. | 56/13.4 |
| 2,953,888 | 9/1960 | Phillips, Jr. et al. | 56/13.4 |
| 2,955,402 | 10/1960 | Strasel | 56/13.4 |
| 3,014,333 | 12/1961 | Clark, Jr. | 56/295 |
| 3,178,872 | 4/1965 | Swindler | 56/13.4 |
| 3,367,091 | 2/1968 | Weiland | 56/13.4 |
| 3,468,108 | 9/1969 | Mattson | 56/13.4 |
| 3,601,960 | 8/1971 | Buechler | 56/320.2 |
| 3,690,051 | 9/1972 | Wood | 56/295 |
| 3,970,411 | 7/1976 | Wallman | 416/178 |

*Primary Examiner*—Paul J. Hirsch
*Attorney, Agent, or Firm*—Sughrue, Mion, Zinn, Macpeak & Seas

[57] ABSTRACT

A rotary grass mower of the type having a hollow motor body and a motor mounted on top of the body having a downwardly depending shaft which carries a disc bearing grass cutter blades. A blower is provided within the body above the disc and within the body to draw air downwardly from the top of the body and then outwardly and upwardly into an annular plenum chamber which is formed in the body above the path of movement of the cutter blades. The plenum chamber provides a discharge chute for air and entrained grass cuttings and the cuttings are moved, by air from the blower, in the chute to a discharge opening thereof. The air is deflected upwardly into the plenum chamber by an upturned rim on the disc. The circulated air is used to cool the motor.

4 Claims, 5 Drawing Figures

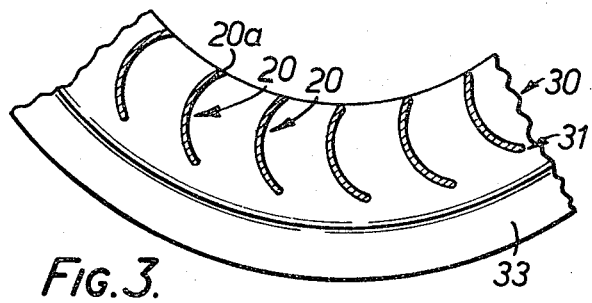
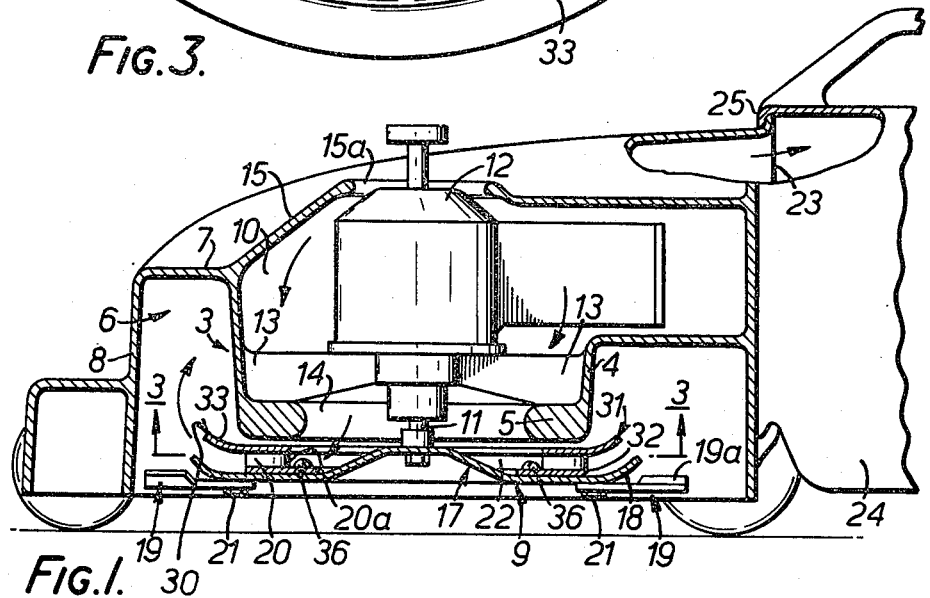
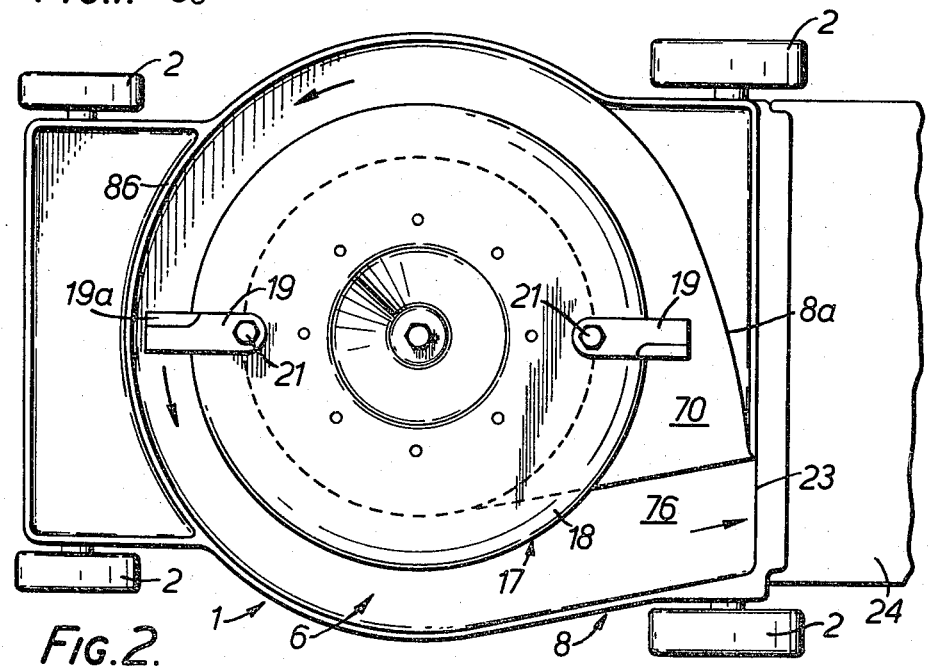

GRASS MOWER

BACKGROUND OF THE INVENTION

(1) FIELD OF THE INVENTION

This invention relates to grass mowers.

(2) PRIOR ART

Grass mowers of the rotary type are well known. These comprise a mower body carrying a motor which drives a horizontal rotary disc to which the grass cutter blades are attached. Such mowers are often provided with a grass catcher in which case the cutter blades may be shaped so as to create an air stream by means of which the grass clippings are conveyed to the catcher. This conveyance may be via an annular chute formed in the mower body and extending above and around the path of movement of the cutter blades. The chute commonly has a generally helical roof so that the height of the chute increases from a lowermost point at one end thereof to a highest position at a delivery end of the chute which in use communicates via an opening in the mower body with the grass catcher.

Generally speaking, to obtain satisfactory performance from mowers of the above kind, it is necessary to operate the mower so that the cutter blades are rotated at a relatively high speed in order that a sufficient air flow will be provided in order to adequately deliver grass cuttings into the chute for delivery to the grass catcher. Because of this, the selected operating speed is usually greater than is necesary or even desirable for effective grass cutting. One effect of this is that grass cutting and collecting under certain conditions, such as where the grass is wet, may be less efficient than is desirable and also results in the mower being noisier to operate than would otherwise be the case. In particular, with regard to the latter, many mowers of the kind in question are operated by small internal combustion engines which are particularly noisy when operated at speeds necessary to ensure effective grass catching.

The specification of U.S. Pat. No. 2,953,888 (J. T. Philips Jnr. et al) describes a rotary type harvester having a body which encompasses a disc thereunder, the disc being rotatable about an upright axis and having cutter blades thereon for effecting harvesting of green forage over which the harvester is in use moved. This harvester includes fan blades on the top of the disc and these blades, in use of the harvester generate an air flow which is used to entrain, elevate and convey the severed crop material within a downwardly open space of the body within which the disc is housed. Severed crop material is by this means conveyed away from the harvester via a discharge opening which communicates with a tangentially arranged discharge tube comunicating with the said space. Deflection of severed material into this discharge tube is arranged by means of an upright baffle depending from the roof of space within which the mower disc and cutter blades are housed and extending outwardly from the disc axis over the cutter blades and also outboard of the cutter blades. In use of the harvester, air is admitted into the interior space in the harvester body and the fan blades operate to direct cuttings against the interior baffle plate for deflection into the discharge tube.

Whilst this mower utilizes fan blades to effect transport of grass cuttings, the transport is effected by an air flow which is outward and somewhat downward and is directed to cooperate with the fixed baffle plate for deflection of the grass cuttings to the discharge pipe. The arrangement is not directed to utilization of fan generated air flow in mowers of the kind having an annular conveying chute.

SUMMARY OF THE INVENTION

In accordance with the present invention there is provided a rotary grass mower of the type having a hollow motor body and a motor mounted on top of the body having a downwardly depending shaft which carries a disc bearing grass cutter blades, the mower being characterised in that means is provided to draw air downwardly from the top of the body and thence into an annular plenum chamber which is formed in the body above the path of movement of the cutter blades and which provides a discharge chute for air and entrained grass cuttings; said means including an air blower above the disc and within the body.

The invention also provides a rotary grass mower comprising a mower body having an inlet passage with an opening communicating with the underside of the body, a motor mounted on the body and having a downwardly depending upright output shaft to the axis of which said opening is adjacent, a horizontal disc mounted on the lower end of the motor output shaft and positioned at the underside of said body, grass cutter blades mounted on the disc, and a plurality of fan blades disposed between the underside of the body and the disc and rotatable with the disc so as to draw air down said air inlet passage through said opening and thence outwardly of said axis below the underside of the body, said body further defining a plenum chamber extending around the disc and above said cutter blades and providing for delivery of grass clippings cut by the cutter blades to a grass catcher, the plenum chamber being arranged to receive the outwardly blown air from the fan blades such that the grass clippings are conveyed therein by the blown air, said fan blades being positioned to extend outwardly of said axis from inner ends radially outwardly positioned relative to said opening of the air inlet passage, and surfaces of the mower being provided extending transversely of said axis and adjacent respective upper and lower margins of the fan blades to substantially confine said outward air flow to spaces between consecutive said fan blades.

BRIEF DESCRIPTION OF THE SEVERAL VIEWS OF THE ACCOMPANYING DRAWINGS

The invention is further described with reference to the accompanying drawings in which;

FIG. 1 is a vertical section of a lawn mower constructed in accordance with the invention;

FIG. 2 is an underside view of the lawn mower of FIG. 1;

FIG. 3 is a fragmentary section on the line 3—3 in FIG. 1;

Figure 4:
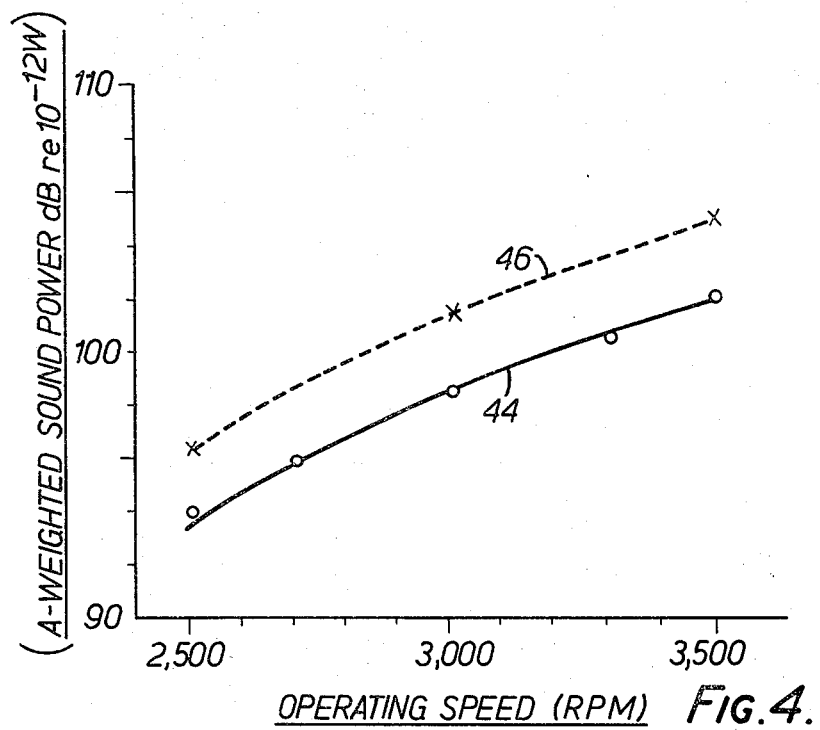
Figure 5:
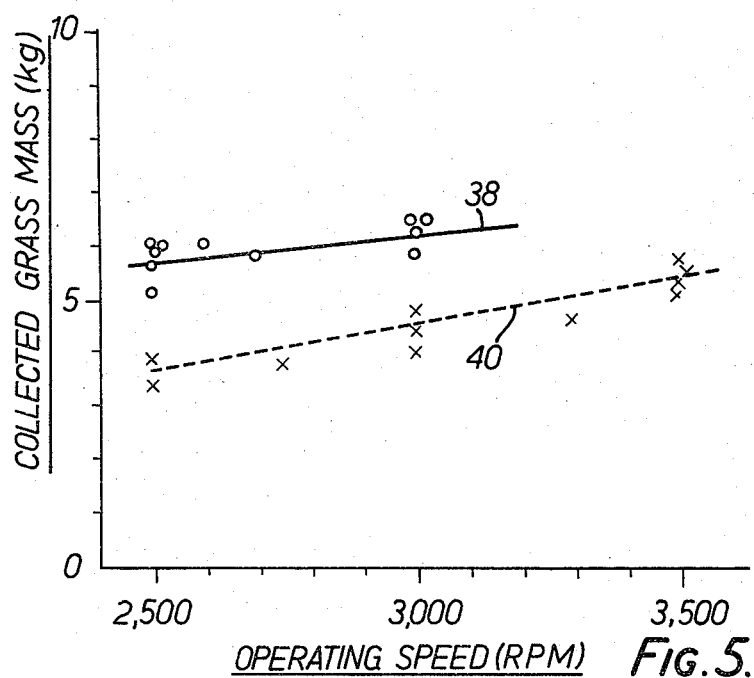

FIG. 4 comprises comparative graphs of sound output power against operating speed; and FIG. 5 comprises comparative graphs of collected grass mass against operating speed.

DETAILED DESCRIPTION

The illustrated mower comprises a body denoted generally as 1 mounted on ground wheels 2. A conventional pushing handle (not shown) preferably of the folding type, may be attached to the body 1 to enable the mower to be pushed across the area of grass to be mown.

Body 1, which may be comprised of a metal die casting, for example, of aluminum alloy, comprises a central portion 3 shaped to define a cylindrical well 10 within a peripheral wall 4 and a floor 5. Body 1 also defines a downardly opening volutoid annular channelshaped chute 6 which constitutes a plenum chamber. The chute is defined by an outer peripheral wall 8 of body 1 and a roof 7 of the body. Wall 8 depends below the level of well floor 5 and has a skirt which encompasses a rotary blade and disc assembly generally denoted as 9.

Disc and blade assembly 9 is mounted on the lower end of the upright output shaft 11 of a drive motor 12 which is housed within well 10 of the mower body. More specifically, the motor 12 is supported in struts 13 extending inwardly from wall 4 immediately above floor 5 of the well. The output shaft 11 extends from motor 12 downwardly through a central opening 14 in the well floor. A cowl 15 on body 1 extends across the upper end of well 10 and over motor 12. Cowl 15 has an opening 15a at the top which communicates with the interior of well 10 so that there is defined an air passageway through the well, such that air can pass through opening 15a, into the well, around motr 12 to the opening 14 in the well floor.

Blade and disc assembly 9 comprise a horizontal disc 17 which is attached concentrically to the lower end of motor output shaft 11 and which has a smoothly curved upturned rim 18. Rim 18 is arcuate when viewed in radial secton (FIG. 1) and is arranged such that when so viewed, the tangent thereto at the periphery of the disc makes an angle of approximately 45° to the horizontal. Grass cutter blades 19 are attached to the underside of disc 17 by attachment bolts 21 at circumferentially spaced locations immediately within the upturned rim 18 of the disc. Bolts 21 provide pivotal attachments for the blades so that when the mower is operated, the blades are flung outwardly by centrifugal action to radiate out from the disc below and slightly outward of the upturned rim 18 of the disc. The blades 19 are in this instance of generally conventional form, having upwardly splayed rear portions 19a.

A blower in the form of a fan assembly 30 is positioned on the upper side of disc 17, being positioned between the disc and the underside of well floor 5. This is in the form of a plastics moulding having two overlying annular plates 31, 32 between which extend a number of centrifugal fan blades 20. Blades 20 extend from locations close to the inner edge 31a of plate 31 outwardly of the axis of motor shaft 11 in slightly arcuate paths as viewed in plan (FIG. 3) to locations close to an upturned outer rim 33 of plate 31. The fan assembly 30 is secured to disc 17, in concentric relation thereto, by screws 36 extending through plate 32 into the disc 17.

The upper surface of plate 31 is closely spaced below the well floor 5 (the spacing being exaggerated in FIG. 1 for clarity). Opening 14 in the well floor immediately overlies the central opening in the top of fan assembly 30, which central opening is provided by plate 31. Plate 31 is dimensioned so that the rim 33 turns upwardly, immediately past the outer periphery of well floor 5 and extends above and parallel to rim 18 on disc 17. The fan assembly 30 thus cooperates with disc 17 to provide a generally annular fan chamber 22 immediately below well floor 5 and above disc 17, this chamber being bounded on the upper side by the undersurface of plate 31 and at the lower side by the upper surface of the disc 17 and the upper side of plate 32, where this overlies disc 17. Because of the close spacing of the plate 31 to the well floor 5 fan chamber 22 provides substantially the only communication between opening 14 and the circular exit opening of chamber 22 between rim 33 and rim 18. This circular exit opening of the fan chamber 22 communiates with the bottom of the plenum chamber defined by chute 6.

The arrangement of the fan assembly 30 is such that when motor 12 operates air is drawn inwardly through cowl opening 15a into well 10, around motor 12, through opening 14, outwardly through fan chamber 22, and upwardly and outwardly with a swirling motion into the chute 6 immediately above the path of movement of cutter blades 19. The upward component of movement is imparted by the upturned nature of the rims 18 and 33.

The roof 7 of chute 6 is of generally helical form increasing in height in the direction of rotation of the shaft 11 from a lowermost portion 7a(FIG. 2) to a highest portion 7b reached after a single convolution around the well 10 at which point the chute 6 opens out into a discharge opening 23 to which a grass catcher 24 is connected. Grass catcher 24, which may be of moulded plastics construction, has a slightly resilient mouth rim 25 which can be snap fitted onto the chute discharge opening 23 and which is also provided with an air exhaust grill (not shown). In use of the mower, the air flow provided by the fan blades 20 provides an effective catching action to deflect grass cuttings cut by blades 19 into the plenum chamber provided by chute 6 and thence around this and through discharge opening 23 into catcher 24. The cutting blades 19 need only cut grass and deflect the grass clippings upwardly into chute 6; the swirling air stream provided by fan blades 20 effects conveyance to the catcher.

The described arrangement has several advantages over conventional mowers in which the air stream for conveying grass clippings in a chute like chute 6 must be conveyed solely by the cutter blades. In particular, the strong air stream generated by the fan assembly provides more effective direction of cuttings into the chute 6 even when the motor 12 is run at relatively low speeds. In FIG. 5, for example, graph 38 is a plot of grass mass collected in a mower constructed in accordance with the invention for a variety of operating speeds whilst graph 40 is a corresponding plot for a mower identical to the mower used to obtain data for graph 38 but without the fan assembly 30. It will be observed that the performance of the mower constructed in accordance with the invention even at speeds as low as 2,500 RPM is generally superior to that of the mower used to obtain graph 30 even when the latter mower was operated towards the top of its operating speed range at 3,500 RPM. This has the important result that mowers constructed in accordance with the invention will, by virtue of their lower operating speed, be generally less noisy than conventional mowers. Internal combustion engine driven mowers in particular, when operated at high speeds as is normally the case, are particularly noisy and the noise reduction provided by the invention is particularly significant in such mowers. The noise reduction obtainable is illustrated further with reference to FIG. 4 in which graph 44 shows the sound power generated by an electrically operated mower constructed in accordance with the invention for various operating speeds. It will be seen that the difference between the noise power produced at the extreme operating ranges of 2,500 RPM and 3,500 RPM is quite considerable.

In the described mower, a further noise reduction over conventional mowers is achieved not only because of the fact that the mower can operate at a lower speed, but because steps are taken in the design of the mower to minimize noise caused by interaction of air-flow from the blades 19 with the surface of the body 1. In particular, the blades 19 are positioned well below the well floor 5, (such as two of four inches below), the outer peripheral wall 9 correspondingly being extended further down below the well floor than is usual in conventional mowers. Furthermore, outer peripheral wall 8 is arranged to minimize sharp discontinuities in its configuration. In particular, the portion 8a (FIG. 2) of the wall adjacent the discharge opening 23, and which follows opening 23 reckoned in the direction of rotation of disc 17, is designed so that it gradually and smoothly curves inwardly towards the axis of shaft 11, from a location immediately next to discharge opening 23, into the substantially circular path of the remainder of the wall indicated by reference numeral 8b in FIG. 2. Thus, as the cutter blades 19 pass over the end of the chute 6 adjacent the discharge opening 23, the outer ends of the blades only gradually move into proximity with the wall 8 as they pass further around the chute 6.

The result of the described positioning of the cutter blades away from the underside of wall 8 is illustrated in FIG. 4 by comparing the graph 44 showing the relationship between generated sound power and operating speed for the mower of the invention with the graph 46 which is a corresponding graph for a conventional mower in which, in accordance with previous practice, the cutter blades are closer to the mower underside and in which the wall portion 8a has a relatively sharp discontinuity, being substantially concentric with the motor axis rather than having the "lead-in" as provided by the wall portion 8a of the present invention.

The strong air stream generated by the fan asssembly 30 is in part due to the relatively efficient arrangement and positioning of the fan blades 20 so that these extend between opposed surfaces (on plates 31 and 32 in this instance) and such that air travelling from well 10 to chute 6 is substantially confined to flow through the spaces between these opposed surfaces and the fan blades. The inner upright edges 20a of the fan blades are also disposed just out-board of the central opening 14 in well floor 5 whilst the edges of well floor 5 defining opening 14 are smoothly curved (FIG. 1) in order to promote effective air flow.

The airstream created by the fan assembly 30 aids in cooling motor 12, since the motor is located directly in the downwardly directed airflow in well 10.

The described mower also has the advantage that the positioning of the fan blades is such that these are protected from the grass cuttings, dust and stones that wear out the cutter blades and the catching efficiency is not affected by deterioration of the cutter blades.

The described arrangement also ensures, by virtue of the upward curvature of rim 18 on disc 17 and rim 33 on plate 31, that a substantially upward component of movement is imparted to the air moving outwardly from the fan assembly and this also promotes effective catching. The swirling movement of air generated by the fan also considerably assists in promoting effective catching. In this connection, the fan will of course, by virtue of its rotary motion, impart a considerable component of velocity to the air leaving the fan, the component being in the direction tangential to the rim of the disc.

Of course, the fan assembly could be of different form to that shown. For example, the blades 20, instead of being formed as a plastic moulding, could be integrally formed or attached to disc 17 and either or both of plates 31 or 32 could be omitted. The rim 18 alone will generally provide adequate upward direction of air flow even in the absence of rim 33 on plate 31.

We claim:

1. A rotary grass mower of the type having a hollow body with a horizontally rotatable cutting member therein, said cutting member being connected to the lower end of shaft coupled to a motor for driving the shaft and cutting member and wherein a downwardly depending skirt of the body defines the outer wall of a volutoid annular region above the periphery of the cutting member, the cutting member being in the form of a disc with cutting blades extending to the vicinity of the body skirt and said body having an opening therein above said disc, air blower means operatively connected to said motor for causing a strong flow of air to be drawn from outside the mower downwardly through said opening and then outwardly across the upper surface of said disc and upwardly into the volutoid annular region wherein is formed an energetically-swirling, tangential flow of air having an upward component effective in suspending and carrying grass clippings around the volutoid annular region and discharging them tangentially through a discharge opening leading from said volutoid annular region, said blower means comprising an annular horizontally disposed plate arranged above the disc and separated therefrom by vertically disposed blower blades which are attached to both the plate and the disc so that in operation air is drawn axially downwardly along the drive shaft past said opening in said body and into a central blower intake opening defined by said annular plate.

2. A rotary grass mower as claimed in claim 1, wherein said motor is carried by said body at a location above said disc and said shaft is an output shaft of said motor, an air inlet passage for the blower means is formed within the body below or around the motor and defining said opening in said body so that in operation, the blower draws air downwardly from the top of the body past the motor and axially along the drive shaft.

3. A mower according to claim 1, wherein said blower means is driven by the drive shaft and is adapted to discharge air onto the upper surface of the disc and wherein the disc is provided with an upturned rim to deflect the air from the blower upwardly toward the skirt.

4. A rotary grass mower comprising a mower body having an inlet passage with an opening communicating with the underside of the body, a motor mounted on the body and having a downwardly depending upright output shaft the axis of which is adjacent said opening, a horizontal disc mounted on the lower end of the motor output shaft and positioned at the underside of said body, grass cutter blades mounted on the disc, a plurality of fan blades disposed between the underside of the body and the disc and rotatable with the disc so as to draw a strong flow of air down said air inlet passage through said opening and thence outwardly of the axis below the underside of the body, said body further defining a volutoid annular region extending around the disc and above said cutter blades and providing a chute for delivery of grass clippings cut by the cutter blades to a grass catcher, said body having an inclined roof extending substantially along the length of the volutoid region such that the height of the volutoid annular region various progressively along the length thereof so as to increase in the direction of rotation of said disc, the volutoid annular region terminating at its highest end in a discharge opening communicable with said grass catcher, the outer rim of said disc being upturned to guide the air blown by the fan blades upwardly into the volutoid annular region to form an energetically-swirling tangential air flow in said volutoid annular region such that the grass clippings are conveyed in the volutoid annular region by that air flow, said fan blades being positioned to extend outwardly of said axis from inner ends to outer ends radially outwardly positioned relative to the opening of the air inlet passage, a second disc secured to the upper edges of said fan blades for rotation therewith and positioned close to the undersurface of said body whereby said outward air flow is substantially confined to the spaces defined between consecutive fan blades and said discs.

* * * * *